United States Patent
Drake et al.

(10) Patent No.: US 9,213,342 B2
(45) Date of Patent: Dec. 15, 2015

(54) WIRELESS CONTROL OF A HEATING OR COOLING UNIT

(75) Inventors: Willis K. Drake, University City, MO (US); William C. Leise, St. Louis, MO (US); Rishi Siravuri, Maryland Heights, MO (US); Marc P. N. Rody, Great Falls, VA (US)

(73) Assignee: Emerson Electric Co., St. Louis, MO (US)

( * ) Notice: Subject to any disclaimer, the term of this patent is extended or adjusted under 35 U.S.C. 154(b) by 808 days.

(21) Appl. No.: 13/073,286

(22) Filed: Mar. 28, 2011

(65) Prior Publication Data

US 2012/0248207 A1 Oct. 4, 2012

(51) Int. Cl.
| | | |
|---|---|---|
| *F24F 7/00* | (2006.01) | |
| *F25D 23/12* | (2006.01) | |
| *F24F 13/08* | (2006.01) | |
| *F24F 7/007* | (2006.01) | |
| *G05D 23/19* | (2006.01) | |
| *F24F 11/00* | (2006.01) | |
| *F24D 5/04* | (2006.01) | |
| *F24D 19/10* | (2006.01) | |

(52) U.S. Cl.
CPC .............. *G05D 23/1931* (2013.01); *F24D 5/04* (2013.01); *F24D 19/1084* (2013.01); *F24F 11/0012* (2013.01); *F24F 2011/0068* (2013.01)

(58) Field of Classification Search
CPC .............. F24F 11/0012; F24F 2011/0068; F24F 11/006; F24F 11/0001; F24F 11/012; G05D 23/1902
USPC ........ 236/1 C, 51; 62/262; 454/338, 256, 258
See application file for complete search history.

(56) References Cited

U.S. PATENT DOCUMENTS

| | | | | |
|---|---|---|---|---|
| 3,594,546 | A | * | 7/1971 | Smillie et al. ................. 219/501 |
| 4,189,093 | A | * | 2/1980 | Schnaibel et al. .............. 236/37 |
| 4,278,841 | A | | 7/1981 | Regennitter et al. ............. 179/5 |
| 4,315,249 | A | | 2/1982 | Apple et al. ............. 340/825.52 |
| 4,479,604 | A | | 10/1984 | Didner ........................ 236/49 |
| 4,594,580 | A | * | 6/1986 | Nelson ......................... 340/521 |
| 4,679,411 | A | | 7/1987 | Pearse, Jr. ..................... 62/519 |
| 4,703,325 | A | | 10/1987 | Chamberlin et al. ..... 340/825.17 |
| 4,734,871 | A | | 3/1988 | Tsunoda et al. .............. 364/557 |
| 4,811,195 | A | | 3/1989 | Evans .......................... 364/133 |
| 4,864,588 | A | | 9/1989 | Simpson et al. .................. 375/1 |
| 4,918,932 | A | * | 4/1990 | Gustafson et al. ................ 62/89 |

(Continued)

*Primary Examiner* — M. Alexandra Elve
*Assistant Examiner* — Henry Crenshaw
(74) *Attorney, Agent, or Firm* — Harness, Dickey & Pierce, P.L.C.

(57) ABSTRACT

A control system includes a remote temperature sensor configured to wirelessly communicate a signal indicative of a space temperature, and a return air temperature sensor configured to output a signal indicative of a temperature of return airflow within an air conditioning/heating unit. The system further includes a controller segregated from the space that is responsive to the signals from the sensors for determining a working sensed temperature based upon a temperature value associated with the return air sensor and at least one temperature value associated with at least one remote temperature sensor. The controller is configured to compare the working sensed temperature to a set-point temperature and responsively generate a command signal to activate the air conditioning or heating unit to control temperature relative to a set-point. The controller controls the air conditioning/heating unit at all times based upon the temperature value associated with the return air sensor.

24 Claims, 3 Drawing Sheets

(56) References Cited

U.S. PATENT DOCUMENTS

| | | | |
|---|---|---|---|
| 5,224,648 A | 7/1993 | Simon et al. | 236/51 |
| 5,682,329 A * | 10/1997 | Seem et al. | 700/276 |
| 5,707,190 A | 1/1998 | Hiraguri et al. | 411/56 |
| 5,801,940 A | 9/1998 | Russ et al. | 364/138 |
| 6,508,407 B1 * | 1/2003 | Lefkowitz et al. | 236/51 |
| 6,513,723 B1 | 2/2003 | Mueller et al. | |
| 7,845,576 B2 | 12/2010 | Siddaramanna et al. | 236/94 |
| 2005/0252984 A1 * | 11/2005 | Ahmed | 236/51 |
| 2005/0268629 A1 * | 12/2005 | Ahmed | 62/201 |
| 2006/0071087 A1 * | 4/2006 | Kates | 236/1 B |
| 2007/0205294 A1 * | 9/2007 | Byczynski et al. | 236/44 C |
| 2008/0197995 A1 * | 8/2008 | Taki | 340/447 |
| 2009/0143918 A1 * | 6/2009 | Amundson et al. | 700/278 |
| 2010/0006660 A1 | 1/2010 | Leen et al. | 236/51 |

\* cited by examiner

WIRELESS CONTROL OF A HEATING OR COOLING UNIT

FIELD

The present disclosure relates to climate control systems for providing conditioned air to a space, and more specifically to control of a heating and cooling system utilizing remote temperature sensors within the space.

BACKGROUND

This section provides background information related to the present disclosure which is not necessarily prior art.

Climate control systems provide heating or cooling to control temperature within a space relative to a desired set-point temperature. These systems employ a conventional thermostat that senses temperature in the space to determine when to operate the climate control system. Remote temperature sensors may also be wired to the thermostat to better sense temperature throughout the space, and to communicate sensed temperature to the thermostat. Based on the sensed temperature, the conventional thermostat connects a voltage source via switching devices to provide a heating request signal to an HVAC terminal, or to provide a cooling request signal to an HVAC wired terminal, to establish operation of the heating or cooling unit. However, such thermostats require installation of wiring to where the thermostat is mounted in the space, and further require switching devices for establishing connection of a voltage source to the heating or cooling unit via the wiring. As such, operation of the heating and cooling unit is dependent on installation and wiring of a thermostat within the space.

SUMMARY

This section provides a general summary of the disclosure, and is not a comprehensive disclosure of its full scope or all of its features.

Various embodiments are provided of a control system for controlling an air conditioning unit or heating unit for a space, where the controller is disposed in close proximity to an air conditioning unit or heating unit, such that the controller is disposed outside of or segregated from the space to be conditioned. One embodiment of a control system comprises at least one remote temperature sensor within a space that is configured to wirelessly communicate a signal indicative of air temperature within the space, and a return air temperature sensor. The return air temperature sensor is configured to output a signal indicative of a temperature of return airflow within an air conditioning unit or heating unit. The system further includes a controller responsive to the signals from the sensors for determining a working sensed temperature based upon a temperature value associated with the return air sensor and at least one temperature value associated with the at least one remote temperature sensor. The controller is segregated from the space and configured to compare the working sensed temperature to a set-point temperature and responsively generate a command signal to activate the air conditioning unit or heating unit to control the temperature in the space relative to the set-point temperature. The controller is configured to control operation of the air conditioning unit or heating unit at all times based upon the temperature values associated with the return air sensor and the at least one remote temperature sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

According to one aspect of the present disclosure, various embodiments of a control system for controlling an air conditioning unit or heating unit for a space are provided. The control system embodiments include a controller disposed in close proximity to an air conditioning unit or heating unit, such that the controller is disposed outside of or segregated from the space to be conditioned. The controller is configured to receive wireless signals from at least one remote temperature sensor disposed within the space to be conditioned. In the various embodiments, the controller is configured to compare a working sensed temperature relative to a set-point temperature, and to provide command signals for activating the air conditioning unit or heating unit, such that command signals to the air conditioning and/or heating unit for controlling heating or cooling operation are provided solely by the controller that is segregated from the space (and not provided by a thermostat within the space). In the various embodiments, the controller may optionally be used with or without a thermostat. However, the controller provides all command signals for controlling heating or cooling operation regardless of whether input is received from the thermostat.

In the various embodiments of the present disclosure, the system further includes at least one remote temperature sensor configured to wirelessly communicate a signal indicative of air temperature within the space, and a return air temperature sensor configured to output a signal indicative of the temperature of return airflow within an air conditioning unit or heating unit. The controller is operable to receive the signals from the sensors and to determine a temperature value associated with the return air sensor and a temperature value associated with the at least one remote temperature sensor. The controller is generally segregated from the space and disposed in close proximity to an air conditioning unit or heating unit, which the controller controls to maintain a desired set-point temperature. The controller is configured to determine a working sensed temperature based upon the temperature values associated with the return air sensor and the at least one remote temperature sensor, and to compare the working sensed temperature to a set-point temperature. Based upon the comparison, the controller is configured to generate a command signal to activate the air conditioning unit or heating unit to control the temperature in the space relative to the set-point temperature. The controller is configured to control the air conditioning unit or heating unit at all times based upon temperature values associated with the return air sensor and the remote temperature sensor.

Figure 1:
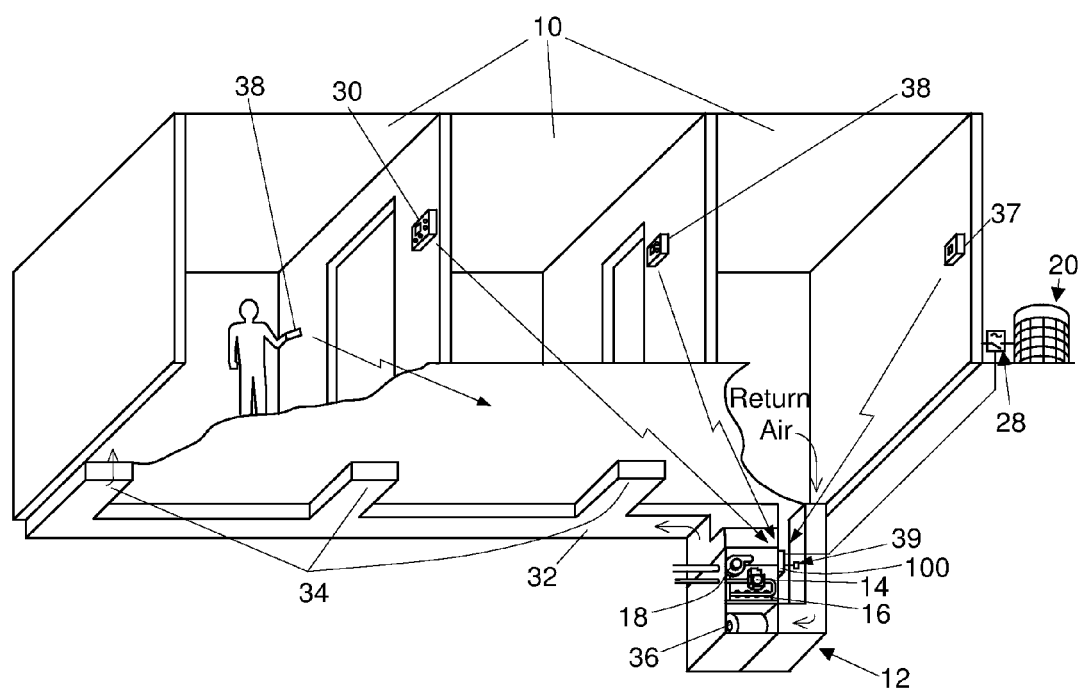
FIG. 1 is a cut away view of a space showing one embodiment of a control system for an air conditioning unit or heating unit, in accordance with the principles of the present disclosure.

One embodiment of a control system for controlling a climate control system comprising a heating unit 12 and/or an air conditioning unit 20 is shown in FIG. 1. The heating unit 12 may, for example, comprise a gas valve 14 for controlling gas flow to the burner 16, a combustion air blower 18 for providing combustion air to a burner 16, for heating air that is forced through ducting 32 and vents 34 by circulating air blower 36. The air conditioning unit 20 may, for example, comprise a switch or compressor contactor 28 that switches current to a motor of a compressor or condenser fan, and circulating air blower 36 provides for circulating cooled air through ducting 32 and vents 34 to the space 10. The above climate control apparatus (such as heating unit 12) may be located in a basement or a closet, for example, in a location that is segregated from the space 10 to be conditioned. The air conditioning unit 20 and/or heating unit 12 are controlled by a controller 100 that is disposed in close proximity to the heating unit 12 and/or air conditioning unit 20, which is segregated from the space 10 to be conditioned. The controller 100 receives signals from various temperature sensors, as described below.

The climate control system includes at least one remote temperature sensor 37 within the space 10 that is configured to wirelessly communicate a signal indicative of air temperature within the space 10. The at least one remote temperature sensor 37 is configured to sense temperature and transmit a signal or value representative of the sensed temperature of an area within the space 10. The at least one remote temperature sensor 37 is preferably battery powered, and wirelessly transmits information via a radio frequency transmitter (not shown). The at least one remote temperature sensor 37 may transmit temperature information on a periodic basis, or upon sensing a minimum change in sensed temperature to reduce the number of transmission signals and prolong battery life. One example of a remote temperature sensor 37 that is capable of transmitting temperature information is a F0148-1328 remote sensor made by White-Rodgers, a Division of Emerson Electric Co. Another example of a remote sensor for transmitting information is disclosed in a co-assigned U.S. Pat. No. 6,513,723 entitled "Method and Apparatus For Automatically Transmitting Temperature Information", and is incorporated herein by reference.

The climate control system further includes a return air temperature sensor 39 configured to output a signal indicative of the temperature of return airflow within the heating unit 12 and/or air conditioning unit 20. It should be noted that the return air temperature sensor 39 is preferably hardwired to the controller 100, such that return air temperature sensor signal information is received via a wired connection with the controller 100 described below.

The climate control system further comprises a controller 100 that is generally segregated from the space 10, and disposed in close proximity to the heating unit 12 and/or air conditioning unit 20, which the controller 100 controls to maintain temperature in the space 10. As stated above, the controller 100 is preferably connected to the return air temperature sensor 39. The controller 100 includes a receiving device configured to receive wirelessly transmitted signals from the at least one remote temperature sensor 37. The controller 100 is operable to receive the signals from the sensors and to determine a temperature value associated with the return air temperature sensor 39 and a temperature value associated with the at least one remote temperature sensor 37. For example, the controller 100 may receive (from a remote temperature sensor 37) a wirelessly transmitted signal with information indicative of sensed temperature, such as a frequency having a value that corresponds to a temperature value. The controller 100 is further configured to combine the above values to determine a working sensed temperature, which is based upon the temperature value associated with the return air sensor and the at least one temperature value associated with the at least one remote temperature sensor. The controller 100 is configured to compare the working sensed temperature to a set-point temperature and responsively generate a command signal to activate the heating unit 12 and/or air conditioning unit 20 to control the temperature in the space 10 relative to a set-point temperature. The controller 100 is configured to control operation of the heating unit 12 and/or air conditioning unit 20 at all times based upon the temperature values associated with the return air temperature sensor 39 and the at least one remote temperature sensor 37. To control heating or cooling operation, the controller 100 includes switching means (described below) for individually providing an electrical power signal for activating the combustion air blower 18, gas valve 14 and circulating air blower 36 to establish heating operation, or switching means for providing an electrical power signal for activating the compressor contactor 28 and circulating air blower 36 to establish cooling operation. The controller 100 is configured to compare the working sensed temperature to the set-point temperature and responsively generate command signals for controlling the switching means to establish operation of the heating unit 12 and/or air conditioning unit 20. Accordingly, the controller 100, which is segregated from the space 10, can control operation of the heating unit 12 and/or air conditioning unit 20 to control the temperature in the space 10 without receiving any input or communication signal requesting heating or cooling operation from a thermostat 30 disposed in the space 10.

Figure 2:
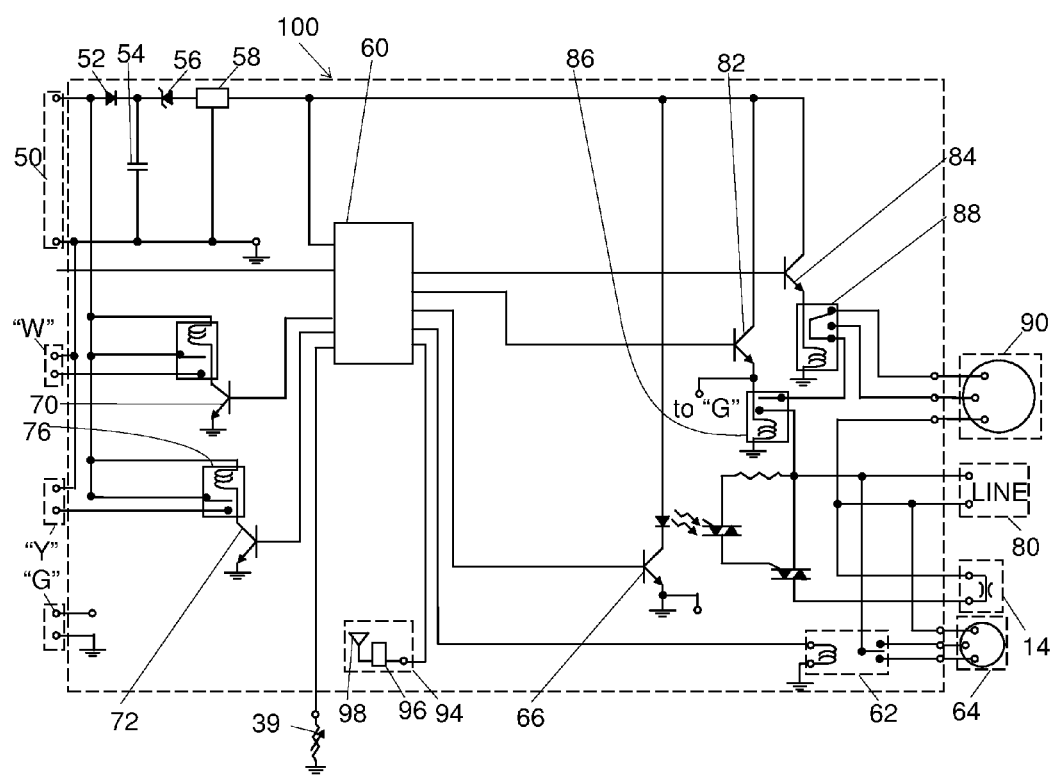
FIG. 2 is a schematic diagram of one embodiment of a controller for an air conditioning unit or heating unit, in accordance with the principles of the present disclosure.

Referring to FIG. 2, the controller 100 preferably includes a microprocessor 60 that is configured or programmed to control the switching means to generate command signals for activating the heating unit 12 and/or air conditioning unit 20. The controller 100 may be powered via a 24 volt alternating current power source 50 by a half-wave regulated 5 volt power supply, which may comprise a diode 52, a capacitor 54, and a zener diode 56 in series with a voltage regulator 58. Alternately, the controller 100 may comprise a transformer or other suitable power supply circuit means. The microprocessor 60 is configured to control switching of a voltage source to provide command signals for activating a heating unit 12 or air conditioning unit 20, as explained below.

The microprocessor 60 may be connected to a relay switch 70 for switching power to a "W" heating terminal, and connected to a switching means 82 for switching power to a "G" fan terminal, for switching a voltage source to the heating unit 12 for activating the combustion air blower 18, gas valve 14 and circulating air blower 36. Thus, the controller 100 provides command signals via the "W" and "G" terminals that are connected to a heating unit 12, for activating a combustion air blower 18, gas valve 14 and circulating air blower 36 to establish heating operation. In place of the "W" and "G" command signals, the controller 100 may alternatively be configured to directly control the heating unit 12. For example, the controller 100 may actuate a relay switching means 62 to switch a line voltage power source 80 to a first motor 64 for the combustion air blower 18 to establish one or more speeds of combustion air flow, and actuate a switching means 66 for switching power to a gas valve 14 to establish gas flow, and actuate a switching means 82 and 84 for respectively actuating power switching relay 86 and speed selection relay 88 for establishing operation of a second motor 90 for the circulating air blower 36 at one or more speeds. The microprocessor 60 could be configured to selectively actuate speed selection relay 88 to switch power from line voltage power source 80 to one of two windings, to establish operation of the second motor 90 at a first speed or second speed at which to provide heated air to the conditioned space. Thus, the microprocessor 60 is configured to control switching means to generate command signals for controlling a heating unit 12 to establish heating operation.

Likewise, the microprocessor 60 is also connected to switching means 76 for switching power to a "Y" terminal for switching a voltage source to the air conditioner unit 20 for activating the air conditioner compressor contactor 28 and compressor and condenser fan motors. The microprocessor 60 may alternatively control switching means 72, 82, 84 and 88 to activate a compressor contactor 28 and second motor 90 for establishing cooling operation. Thus, the controller 100 provides command signals via the "Y" terminal that is connected to the air conditioning unit 20, for establishing cooling operation.

The controller 100 further includes a receiving means 94 for receiving wirelessly transmitted signals from one or more remote temperature sensors 37 within the space 10. The receiving means 94 may comprise an antenna 98 and a receiver chip 96 for decoding radio frequency transmissions received from the one or more remote temperature sensors 37. The microprocessor 60 is in communication with the receiving means 94 for receiving signal information from the remote temperature sensors 37. The controller 100 further includes a wired return air temperature sensor 39 connected to the controller, for sensing a return airflow temperature within a return air duct of the heating unit 12 and/or air conditioning unit 20. The return air temperature sensor 39 is also used in combination with the remote temperature sensor 37, to provide for sensing temperature in the event that signals from the remote temperature sensor 37 are not received by the receiving means 94, as explained below.

The controller 100 includes a microprocessor 60 that has a programmable read-only-memory encoded with an instruction operable to determine a working sensed temperature from a weighted calculation, which is based upon a temperature value associated with the return air temperature sensor 39 and the temperature value associated with at least one remote temperature sensor 37. The weighted calculation is based upon the temperature value associated with the return air temperature sensor 39 such that if signals from remote temperature sensor 37 are not received by the receiving means 94 of controller 100, the return air temperature sensor 39 would still permit sensing air temperature. Specifically, the microprocessor 60 may be programmed to assign a default value of zero for the temperature value for any remote temperature sensor 37 that controller 100 does not receive a signal from. The microprocessor 60 may be programmed with an instruction operable to determine a weighted calculation based upon the temperature value associated with return air temperature sensor 39 in a manner such that a "zero" value assigned to a temperature value (associated with a remote sensor that a signal is not received from) will not affect the sensed temperature values associated with remaining sensors. The microprocessor 60 is therefore programmed to determine a weighted calculation that is based upon the temperature value associated with the return air temperature sensor in a manner such that a temperature value associated with a remote sensor that a signal is not received from will not affect the weighted calculation as determined by the remaining sensors. One example of a weighted calculation that is based upon a temperature value associated with a return air temperature sensor in a manner such that a "zero" value assigned to a remote temperature sensor will not affect the remaining temperature values is shown below:

$$T_{sensed} = (T_{return\ air})^2 + W(T_{remote\ sensor})^2 / [(T_{return\ air}) + W(T_{remote\ sensor})]$$

where W is the weighting for the temperature values associated with the remote temperature sensors. Preferably, the weighting for the temperature value associated with the return air sensor is between 4 percent and 100 percent of the weighting for the temperature value associated with the at least one remote temperature sensor. Accordingly, the controller 100 includes a microprocessor 60 that is configured to perform a weighted calculation based upon a temperature value associated with the return air temperature sensor in a manner such that the temperature value associated with a remote sensor that a signal is not received from will not affect the temperature values associated with any remaining sensors (such as other remote temperature sensors 37 and return air temperature sensor 39).

Upon determining a working sensed temperature from a weighted calculation based upon the temperature values associated with the return air temperature sensor and at least one remote temperature sensor, the microprocessor 60 of the controller 100 is configured to compare the working sensed temperature to a set-point temperature and responsively generate a command signal to activate the heating unit 12 or air conditioning unit 20 to control the temperature in the space 10 relative to a set-point temperature. Thus, the controller 100, and not a thermostat, is responsible for comparing the working sensed temperature to a set-point temperature, and responsively generating a command signal to activate the heating unit 12 or air conditioning unit 20 to control the temperature in the space 10.

In one embodiment of a climate control system, the controller 100 may be used in combination with a user interface device 38, but is not connected to and does not receive any input from a thermostat. The user interface device 38 may be affixed to a wall within the space 10, and may be battery powered. The user interface device 38 may also be a hand held device (e.g. 38'), such as a hand-held remote control, PDA (personal digital assistant) or a mobile device such as an I-Phone®, Droid®, Symbian® or other mobile computer (e.g., i-Pad®, Samsung Tab®, etc.) that contains a software application designed to interface with the controller 100 through wireless communication with the controller 100. The user interface device 38 may be wired to a power source or battery powered, or may be also adapted to plug into a charger or power unit. The user interface device 38 is preferably configured to wirelessly transmit a user-selected set point temperature for heating or cooling operation. The user interface device 38 may optionally wirelessly transmit a signal indicative of a sensed temperature local to the user interface device 38. Where the user interface device 38 includes an internal temperature sensor, the internal temperature sensor may be affected by contact with the user's hand or heat from other devices within the space 10. The user interface device 38 preferably includes a default mode of operation in which the temperature sensed by an internal temperature sensor is not wirelessly transmitted, such that heat from a user's hand or other devices does not affect the working sensed temperature. However, transmission of sensed temperature information by the user interface device 38 may be enabled if a remote temperature sensor 37 becomes damaged, disabled or is removed for construction, renovation, etc. When the temperature sensing function of the user interface device 38 is enabled, the user interface device 38 functions in the same manner as the remote temperature sensors 37. Accordingly, the user interface device 38 may also be configured to transmit sensed temperature information upon sensing a predetermined change in sensed temperature to reduce transmission frequency and prolong battery life. It should be noted that the user interface device 38 may not necessarily include an internal temperature sensor. The user interface device 38 further includes input buttons for inputting or adjusting the desired heating set point temperature or cooling set point temperature. The input buttons also enable programming of set point temperatures during various periods of the day and days of the week.

Where the climate control system includes a user interface device 38 for transmitting a user-selected set-point temperature value to the controller 100, the command signal for activating the heating unit 12 or air conditioning unit 20 is provided exclusively by the controller 100 and not the user interface device 38. The controller 100 is configured to control operation of the heating unit 12 or air conditioning unit 20 at all times based upon the temperature values associated with the return air temperature sensor 39 and the at least one remote temperature sensor 37 (and optionally the user interface device 38), regardless of whether a loss of communication between the user interface device 38 and the controller 100 occurs. Specifically, the controller 100 is configured to determine a working sensed temperature from a weighted calculation based upon the temperature values associated with the return air temperature sensor 39 and at least one remote temperature sensor 37 (and optionally the user interface device 38). The microprocessor 60 of the controller 100 is configured to compare the working sensed temperature to a set-point temperature and responsively generate a command signal to activate the heating unit 12 or air conditioning unit 20 to control the temperature in the space 10 relative to a set-point temperature. Thus, the controller 100, and not the user interface device 38, is responsible for comparing the working sensed temperature to a set-point temperature, and responsively generating a command signal to activate the heating unit 12 or air conditioning unit 20 to control temperature in the space 10.

In a second embodiment of a climate control system, the controller 100 is connected to and receives sensed temperature input from a wireless thermostat 30 in the space, but the controller 100 is not responsive to or controlled by any signals from the thermostat 30 that include commands for activating a heating unit 12 or air conditioning unit 20. Rather, the controller 100 is configured to receive wireless signals from the thermostat 30 that include a user selected set-point temperature for heating or cooling operation. The thermostat 30 includes user input buttons for inputting or adjusting a desired heating set-point temperature or cooling set-point temperature. The user input buttons also enable programming of set-point temperatures during various periods of the day, and various days of the week. The thermostat 30 is preferably battery powered, and may further include an internal temperature sensor for enabling transmission of signals indicative of local sensed temperature. The thermostat 30 functions in the same manner as the remote temperature sensors 37, and may transmit sensed temperature information upon sensing a minimum change in sensed temperature to reduce transmission frequency and prolong battery life. Accordingly, the controller 100 may receive sensed temperature information from the thermostat 30.

While the thermostat 30 may be configured to receive sensed temperature information from the remote temperature sensors 37, and may even compare sensed temperature information to a set-point temperature to ascertain when heating or cooling operation is required, the air conditioning unit 20 and heating unit 12 do not receive commands from the thermostat 30. Instead, the command signals for activating the heating unit 12 or air conditioning unit 20 are provided exclusively by the controller 100 and not the thermostat 30. The controller 100 is configured to control operation of the heating unit 12 or air conditioning unit 20 at all times based upon the temperature values associated with the return air temperature sensor 39 and the at least one remote temperature sensor 37, regardless of whether a loss of communication between the thermostat 30 and the controller 100 occurs. Specifically, the controller 100 is configured to determine a working sensed temperature from a weighted calculation based upon the temperature values associated with the return air temperature sensor 39 and at least one remote temperature sensor 37. The microprocessor 60 of the controller 100 is configured to compare the working sensed temperature to a set-point temperature and responsively generate a command signal to activate the heating unit 12 or air conditioning unit 20 to control the temperature in the space 10 relative to a set-point temperature. The controller 100 may also simultaneously communicate a signal to the thermostat 30 to indicate that the heating unit 12 or air conditioning unit 20 has been activated. Thus, the controller 100, and not the thermostat 30, is responsible for comparing the working sensed temperature to a set-point temperature, and responsively generating a command signal to activate the heating unit 12 or air conditioning unit 20 to control the temperature in the space 10.

In the above systems in which the space includes multiple remote temperature sensors 37, the controller 100 is further configured to determine a differential between the temperature sensed by the multiple remote temperature sensors 37, and where the differential is significant, the controller 100 can start the circulator blower/fan without activating the air conditioner compressor or heating unit, to circulate air within the space such that air within zones having an acceptable temperature may be circulated into zones that are too hot or too cold. If the differential persists, and is significant enough to necessitate heating or cooling, the controller 100 can activate the air conditioner or heating unit. This feature would accordingly reduce the extent of operation of the air conditioner or heating unit, to thereby reduce energy consumption.

According to another aspect of the present disclosure, at least one embodiment of a user-interface device for use in connection with the above system is provided. The user-interface is configured to allow a display device that an occupant/user may view to be powered by a limited energy source such as a battery for an extended period of time (such as two or more years), described below.

Figure 3:
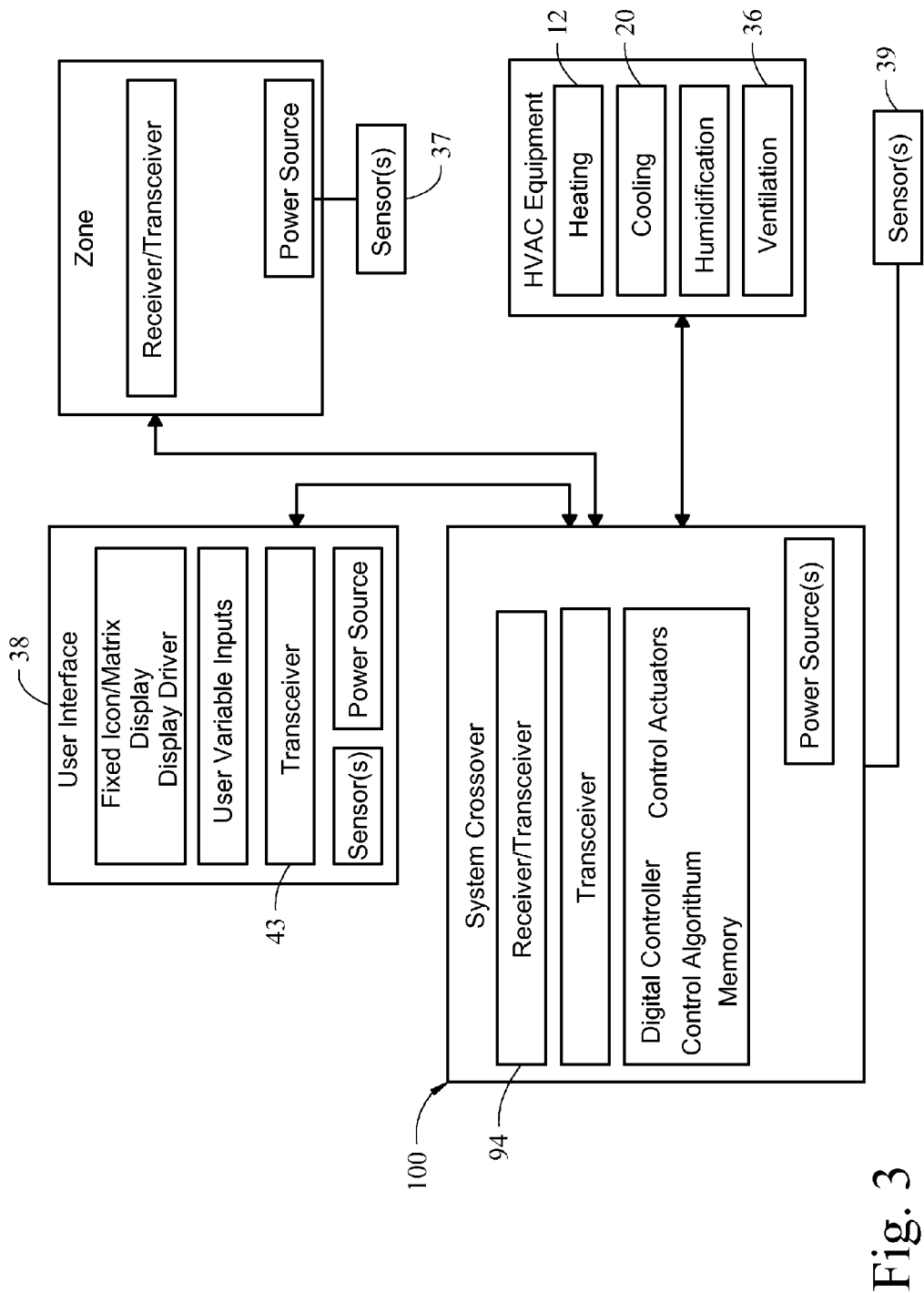
FIG. 3 is a functional block diagram of one embodiment of a controller and user-interface for an air conditioning unit or heating unit, in accordance with the principles of the present disclosure.

Referring to FIG. 3, the user interface device 38 includes a transceiver 43 that is configured to wirelessly communicate to a receiving means 94 of the system controller 100 (e.g., a transceiver), where the controller 100 communicates commands to HVAC equipment for initiating heating or cooling operation. The system controller 100 may receive inputs from various sensors connected to the controller 100, such as inputs from remote temperature sensors 37 and user interface device 38 that includes a receiver/transmitter 43, as shown in FIG. 3. The controller 100 may further include a power supply that is connected to a power source 50, such that the controller 100 is not power-constrained as a battery-operated device may be. Unlike conventional thermostat-controlled systems in which the thermostat controls activation or switching of HVAC components and provides a display for user data input, the present system contains activation and control functions within the controller 100, and incorporates the display and user data entry into a user interface device 38 that is separate from the controller 100. Since the user interface device 38 does not include control functions that a conventional thermostat does, the above described system allows a limited energy source, such as a battery, to power the display of the user interface device 38 for extended periods of time, such as two or more years. Accordingly, the user interface device 38 provides a low power device for input of data (such as set-point temperature) to the controller 100.

The user interface device 38 may utilize a fixed or proprietary design transceiver 43 to communicate between the controller 100 and the user interface device 38, and allows a wide range of transceivers to be incorporated into the system, which provides the advantage of improving the control of power utilized by the user interface device 38. For example, a conventional thermostat that has a dot matrix display would consume far more power than a conventional thermostat with a fixed icon display, and would therefore reduce the conventional thermostat's battery life and compromise its ability to operate switches for controlling activation of the HVAC system. In the presently disclosed system, the control function is included in the controller 100, and does not affect power considerations of the user interface device 38. By having a display utilizing both dot matrix and fixed icons in the user interface device 38, the dot-matrix can be used when display of data requires more symbols that the fixed icons can provide. Likewise, the dot-matrix portion of the display can be selectively disabled so that only fixed icons are displayed when display of data is not required, to reduce power consumption. Thus, the user interface device 38 has a display that includes both static icons, and a portion of the display that includes a dot matrix display to display dynamic symbols or other data and information.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A control system for controlling an air conditioning unit and/or heating unit of a climate control system, the control system comprising:
 a plurality of remote temperature sensors each within a corresponding area of a space having a plurality of areas, each remote sensor configured to wirelessly communicate a signal indicative of air temperature in the corresponding area of the space;
 a return air temperature sensor configured to output a signal indicative of a temperature of return airflow within a return air duct of an air conditioning unit or heating unit;

a user interface device located within the space and configured to receive, store, and transmit a user set-point temperature value input by a user, and a controller responsive to the signals from the sensors for determining a working sensed temperature based upon (a) a temperature value associated with, and determined from the signal communicated by, the return air sensor and (b) at least one temperature value associated with, and determined from at least one signal communicated by, the remote temperature sensors, the controller further configured to determine a differential between temperature values associated with the areas, the controller being segregated from the space and configured to compare the working sensed temperature to a set-point temperature received from the user interface device located remotely in the space and responsively generate a command signal to control operation of the air conditioning unit or heating unit to control temperature in the space relative to the received set-point temperature;

the command signal generated to circulate air in the space from at least one of the areas into at least one other of the areas in response to the differential and using the working sensed temperature, without operating an air conditioning unit compressor and without operating a heating unit heater.

2. The control system of claim 1, wherein the controller is programmed to determine a weighted calculation for determining the working sensed temperature, the weighted calculation based at least in part on the temperature value associated with the return air temperature sensor in a manner such that any temperature value associated with a remote sensor that a signal is not received from will not affect the weighted calculation as determined by the one or more remaining sensors.

3. The control system of claim 1, wherein the controller includes a programmable read-only-memory encoded with an instruction operable to determine a weighted calculation of a working sensed temperature based upon the temperature value associated with the return air sensor and the at least one temperature value associated with the remote temperature sensors.

4. The control system of claim 1, wherein the controller is configured to determine a working sensed temperature using a weighted calculation that weights the temperature value associated with the return air sensor and the at least one temperature value associated with the remote temperature sensors, wherein the weighting for the temperature value associated with the return air sensor is between 4 percent and 100 percent of the weighting for the at least one temperature value associated with the remote temperature sensors.

5. The control system of claim 3, wherein the weighted calculation is a weighted average of the temperature value associated with the return air sensor and the at least one temperature value associated with the remote temperature sensors.

6. The control system of claim 1, wherein a temperature value associated with the remote temperature sensors is assigned a default temperature value of zero when the controller does not receive a signal within a predetermined time from a particular remote temperature sensor with which the temperature value is associated.

7. The control system of claim 1, wherein the controller is configured to receive, from a thermostat mounted in the space, one or more signals indicative of (a) the set-point temperature and/or (b) a temperature sensed in the space, the controller further configured to responsively generate the command signal to the air conditioning unit or heating unit based in part on the one or more signals, no capability of the thermostat to provide command signals being used to provide command signals to the air conditioning unit or heating unit.

8. The control system of claim 1, wherein the user interface device is configured to wirelessly transmit a user-selected set-point temperature value to the controller, wherein all command signals for activating the air conditioning unit or heating unit are provided exclusively by the controller and not the user interface device.

9. The control system of claim 1, further comprising a user interface device that is a mobile device having a software application designed to interface with the controller through wireless communication.

10. The control system of claim 1, further comprising a user interface device that is a mobile computer having a software application designed to interface with the controller through wireless communication.

11. The control system of claim 1, further comprising a thermostat disposed within the space and configured to wirelessly communicate a signal indicative of one of the following: (a) a sensed temperature or (b) user-selected set-point temperature to the controller, where all command signals for activating the air conditioning unit or heating unit are provided exclusively by the controller, and no capability of the thermostat to provide command signals is used to provide command signals to the air conditioning unit or heating unit.

12. The control system of claim 11, wherein the controller is configured to control operation of the air conditioning unit or heating unit based upon the temperature values associated with the return air sensor and the remote temperature sensors, regardless of whether a loss of communication between the thermostat and the controller occurs.

13. A control system for controlling an air conditioning unit and/or heating unit of a climate control system, the control system comprising:

a plurality of remote temperature sensors each within a corresponding one of a plurality of areas within a space, each configured to wirelessly communicate a signal indicative of air temperature in a corresponding area of the space;

a return air temperature sensor configured to output a signal indicative of a temperature of return airflow within a return air duct of an air conditioning unit or heating unit;

a controller responsive to the signals from the sensors for determining a working sensed temperature based upon (a) a temperature value associated with, and determined from the signal communicated by, the return air sensor and (b) at least one temperature value associated with, and determined from at least one signal communicated by, the remote temperature sensors, the controller being further configured to determine a differential between temperature values associated with the areas, the controller being segregated from the space and configured to compare the working sensed temperature to a set-point temperature received from a user interface located remotely in the space and responsively provide an electrical power signal to operate at least a fan of the air conditioning unit and/or of the heating unit based on a size of the differential, to control temperature in the space relative to the received set-point temperature; and a thermostat disposed within the space and including the user interface, the user interface configured to receive, store, and transmit a user set-point temperature value selected by a user and wirelessly communicate a signal indicative of a sensed temperature or user-selected set-point temperature to the controller, electrical power signals for operating the air conditioning unit or heating unit being provided exclusively by the controller, no capability of the thermostat to provide command signals being used to operate the air conditioning unit or heating unit.

14. The control system of claim 13, wherein the controller is programmed to determine a weighted calculation for determining the working sensed temperature, the weighted calculation based at least in part upon the temperature value associated with the return air temperature sensor in a manner such that any temperature value associated with a remote sensor that a signal is not received from will not affect the weighted calculation as determined by the one or more remaining sensors.

15. The control system of claim 13, wherein the electrical power signal is provided to circulate air in the space from at least one of the areas into at least one other of the areas in response to the differential and using the working sensed temperature, without operating an air conditioning unit compressor and without operating a heating unit heater.

16. A control system for controlling an air conditioning unit and/or heating unit of a climate control system, the control system comprising:
a plurality of remote temperature sensors within a space, each configured to wirelessly communicate a signal indicative of air temperature in a corresponding area of the space;
a return air temperature sensor configured to output a signal indicative of a temperature of return airflow within a return air duct of an air conditioning unit or heating unit;
a user interface device located within the space and configured to receive, store, and transmit a user set-point temperature value input by a user, and
a controller responsive to the signals from the sensors for determining a working sensed temperature from a weighted calculation based upon (a) a temperature value associated with, and determined from the signal communicated by, the return air sensor and (b) at least one temperature value associated with, and determined from at least one signal communicated by, the remote temperature sensors, the controller further configured to determine a differential between temperature values associated with the areas, the controller being segregated from the space and disposed in close proximity to the return air sensor so as to allow a direct wired connection between the controller and return air sensor, the controller including a programmable read-only-memory encoded with an instruction operable to compare the working sensed temperature to a set-point temperature received from the user interface device located remotely in the space and responsively provide an electrical power signal to activate the air conditioning unit or heating unit to control temperature in the space relative to the received set-point temperature, wherein the controller is configured to control operation of the air conditioning unit or heating unit based on the differential and using the weighted calculation based upon temperature values associated with the return air sensor and at least one remote temperature sensor.

17. The control system of claim 16, wherein the programmable read-only-memory is encoded with an instruction operable to determine the weighted calculation in a manner such that the temperature value associated with any remote sensor that a signal is not received from will not affect the weighted calculation as determined by the remaining one or more sensors.

18. The control system of claim 16, wherein the weighted calculation weights the temperature value associated with the return air sensor and the at least one temperature value associated with the remote temperature sensors, wherein the weighting for the temperature value associated with the return air sensor is between 4 percent and 100 percent of the weighting for the temperature value associated with at least one remote temperature sensor.

19. The control system of claim 16, wherein the weighted calculation is a weighted average of the temperature value associated with the return air sensor and at least one temperature value associated with the remote temperature sensors.

20. The control system of claim 16, wherein a temperature value associated with the remote temperature sensors is assigned a default temperature value of zero when the controller does not receive a signal within a predetermined time from a particular remote temperature sensor associated with the temperature value.

21. The control system of claim 16, further comprising a user interface device that is a mobile device having a software application designed to interface with the controller through wireless communication.

22. The control system of claim 16, further comprising a user interface device that is a mobile computer having a a software application designed to interface with the controller through wireless communication.

23. The control system of claim 16, wherein the controller does not receive input from and is not connected to a thermostat mounted within the space, and all command signals for activating the air conditioning unit or heating unit are provided exclusively by the controller and not the thermostat.

24. The control system of claim 16, further comprising a user interface device configured to wirelessly transmit a user-selected set-point temperature to the controller, wherein all electrical power signals for activating the air conditioning unit or heating unit are provided exclusively by the controller and not the user interface device, regardless of whether a loss of communication between the user interface and the controller occurs.

* * * * *